July 2, 1929.  B. D. ADAMS  1,718,939
GARDEN TOOL
Filed April 28, 1928

Fig.2ᴬ.

Inventor
Bernard D. Adams
By Rockwell & Bartholow
Attorneys

Patented July 2, 1929.

1,718,939

UNITED STATES PATENT OFFICE.

BERNARD D. ADAMS, OF WEST HAVEN, CONNECTICUT.

GARDEN TOOL.

Application filed April 28, 1928. Serial No. 273,657.

My invention relates to a garden tool, and more especially to a tool for laying out and cutting the edges of flower beds, driveways, etc.

The usual method of laying out flower beds, driveways and the like is to stake out the flower bed or driveway and to use a spade, axe, or similar tool, for cutting the turf to form the edges thereof. While this method is to a certain extent successful, where the edges of the flower bed or driveway are straight, it cannot be used where curves are desired, and accordingly it is the general practice to lay out curves by scratching lines in the turf and then cutting away the turf up to the lines. In either case, it is impossible to secure smooth edges, the methods pursued being apt to produce rough, ragged edges, and where curves are desired, the edges are quite apt not only to be rough but quite often very irregular.

One of the objects of the present invention is to provide a tool for laying out and cutting turf to form flower beds and the like, wherein the rough, irregular edges produced by prior tools and methods are avoided.

Another object of the invention is to provide a tool whereby a driveway, flower bed, or the like, may be laid out and cut in a single operation.

Still another object of the invention is to produce a tool whereby straight lines or curves of an unlimited number of radiuses and forms may be accurately laid out and cut.

A still further object of the invention is to provide a tool having the above characteristics, which, while capable of accurate work, is simple in form and may thus be cheaply manufactured.

To these and other ends, the invention consists in the novel features and combination of parts to be hereinafter described and claimed.

Figure 1:
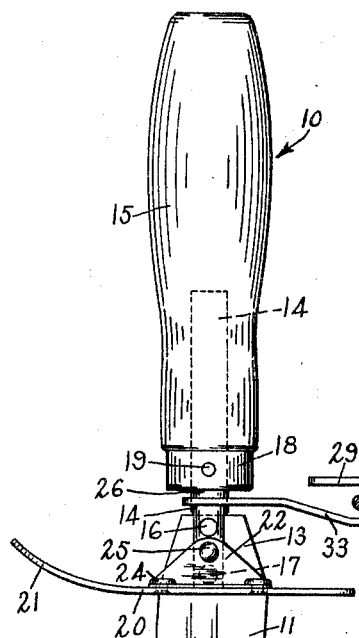
Fig. 1 is an elevational view of a garden tool, according to my invention.
Figure 2:
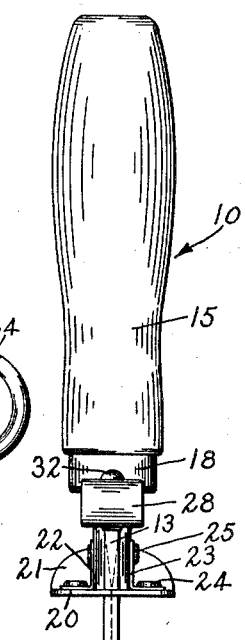
Fig. 2 is a side view of the same.
Figure 2:
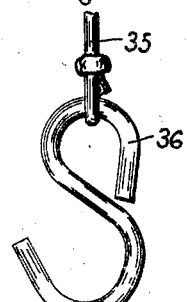
Figure 3:
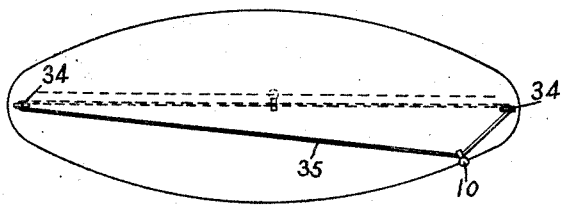
Figure 4:
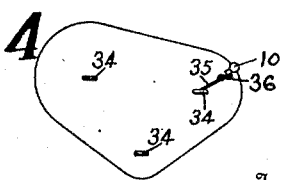

Fig. 2<sup>A</sup> is a fragmentary view showing a hook used in connection with the tool; and Figs. 3 and 4 are diagrams showing the tool in operation in cutting flower beds.

Referring now to the drawings in which I have illustrated my invention by showing a preferred embodiment of the same, the reference numeral 10 indicates, in general, my improved garden tool which comprises a cutting blade or knife 11 having preferably a curved cutting edge 12 and a shank 13 which is secured by means of cylindrical stem 14 to handle 15, stem 14 being bifurcated at its lower end and the shank 13 being received between the bifurcated parts, while rivets 16 and 17 pass through the stem 14 and shank 13 to secure these parts rigidly and permanently together. Stem 14 extends into and is tightly received in handle 15, handle 15 being provided with a ferrule 18 on its lower end while rivet 19 passes through ferrule 18, handle 15 and stem 14 to secure the handle rigidly to stem 14.

At the lower end of stem 14, and where the knife blade joins the shank 13, is a guard 20 having an opening in which the knife 11 closely fits, guard 20 having an upwardly curved forward part 21, for a purpose to be hereinafter pointed out, while the remainder of the main body of the guard is substantially flat and horizontal, as shown in the drawings. Guard 20 is secured to the knife 11 by means of brackets 22 and 23, secured to guard 20 on either side of stem 14 by rivets 24, while one or more rivets 25 pass through brackets 22 and 23 and stem 14 to secure the guard in position on the blade 11.

In operation, the blade 11 of tool 10 may be thrust into the ground until the guard 20 rests on the surface thereof, the operator grasping the handle 15 and forcing the tool through the ground along a desired line to cut the edge of a driveway or a flower bed or the like. The guard 20 ensures that the cut will be of a uniform depth, while the curved forward part 21 is of a great assistance in guiding the tool over a rough surface.

In order to cut smooth regular curves and lines, which is a feature of the present invention, I have provided a simple but effective means which I will now describe. The stem 14 between the shank 13 and handle 15 is provided with a cylindrical part 26 on which is somewhat loosely received a guiding element or swivel 27, which is preferably made out of a strip of metal doubled over at 28 to provide two arms 29 and 30, between which a pulley 31 is mounted on rivet 32, the lower arm 30 being upwardly directed at 33 to substantially the center line of the guide 27 and thence along the central line, being provided at its outer end with a suitable opening in which the cylindrical part 26 of stem 14 is received. A number of stakes 34 are provided, two being all that are usually necessary, which may be inserted into the ground in appropriate situations, to be more fully pointed out hereinafter. A rope 35 is provided having secured to the ends thereof hooks 36.

The operation of the tool may be more readily understood by reference to Figs. 3 and 4, in which two shapes of gardens are indicated, although it will be readily understood that the number and variety of shapes that may be laid out and cut by the tool are unlimited. In Fig. 3, the tool is being used to lay out and cut an elliptical bed, and herein two stakes 34 are driven into the ground at a suitable distance apart, while the cord or rope 35 is stretched between the stakes. The tool 10 is brought into engagement with and guided by the rope 35 by the latter being inserted through the opening between the arms 29 and 30 on the side adjacent stem 14 until the rope 35 comes into contact with the pulley, in which position the tool may be readily moved along the rope and guided by the same. If the rope is stretched tight, as indicated by dotted lines of Fig. 3, it is evident that the tool will be guided along a straight line parallel to the rope, but if the rope is loosened to any extent, as indicated by full lines in Fig. 3, it is evident a curve will be cut, which as indicated in this particular instance, will be in the form of an ellipse.

In Fig. 4, a different type of bed is shown in which, for example, it may be desired to plant a number of shrubs. Herein stakes are driven at the centers of the three curves and the hook 36 inserted into the guide 27 and brought into engagement with the doubled over portion 28. The cord may be tied in turn to each of the stakes to hold the tool at proper distances therefrom, whereupon the tool may be moved around the stakes to cut the adjacent arcuate portions of the flower bed. The curves may be joined by straight lines, after the maner indicated in dotted lines in Fig. 3, it being possible by proper use of the stakes and cord to cut curves and straight lines in conjunction with one another.

It will be readily understood from the above description of my invention, that I have provided a tool which is relatively simple in form, but which may be used to simultaneously lay out and cut various forms and arrangements of gardens and driveways.

While I have shown and described a preferred embodiment of my invention, it is to be understood that the same is not to be limited to all the details shown but is capable of modification and variation within the spirit of the invention and the scope of the appended claims.

What I claim is:

1. In a garden tool, a cutting blade provided with a shank, a bifurcated stem in which said shank is received and secured, a handle secured on said stem, a guard on said blade, said guard comprising a substantially flat plate having an upwardly directed forward part, brackets secured on either side of said stem and to the upper face of said guard, and a guiding element for said blade, said element being made out of a single strip of material doubled on itself to form two arms, and a pulley mounted between said arms, one of said arms being longer than the other and being pivotally mounted on the stem between the shank and handle.

2. In a garden tool, a cutting blade, a stem for said blade, a handle mounted on said stem, a guard on said blade, said guard including a substantially flat plate having an upwardly directed forward part, brackets secured on either side of said stem and to said guard, and a guiding element for said blade, said element being made out of a single strip of material doubled on itself to form two arms, and a pulley mounted betwen said arms, one of said arms being longer than the other and being pivotally mounted on the stem between the shank and handle.

3. In a garden tool, a cutting blade, a handle for said blade and means for guiding said blade along a predetermined path, said means including a flexible element in engagement with a part mounted on the blade, and means secured to the flexible element adapted to be inserted into the ground.

4. In a garden tool, a cutting blade, a handle for the same, a guard for limiting the distance said blade may be inserted into the ground, and guiding means for said tool, said means including a part in which a rope may be slidably received.

5. In a garden tool, a cutting blade, a handle for the same, a guard for limiting the distance said blade may be inserted into the ground, and guiding means for said tool, said means including a part in which a rope may be slidably received, said part being pivotally mounted on the tool.

6. In a garden tool, a cutting blade, a handle for the same, a guard for limiting the distance the blade may be inserted into the ground, said guard being substantially flat throughout the greater part of its length but being provided with an upwardly directed forward end, and guiding means for said tool.

7. In a garden tool, a cutting blade, a handle for the same, a guard for limiting the distance the blade may be inserted into the ground, said guard being substantially flat throughout the greater part of its length but being provided with an upwardly directed forward end, and means for guiding said blade in movements in curved paths.

8. In a garden tool, a cutting blade, a handle for the same, a guard for limiting the distance the blade may be inserted into the ground, said guard being substantially flat throughout the greater part of its length but being provided with an upwardly directed forward end, and guiding means for said tool, said guiding means including an arm extending outwardly from said tool, and a pulley on said arm.

9. In a garden tool, a cutting blade, a handle for the same, a guard for limiting the distance the blade may be inserted into the ground, said guard being substantially flat throughout the greater part of its length but being provided with an upwardly directed forward end, guiding means for said tool, said guiding means including an arm extending outwardly from said tool, said arm being pivotally supported on the tool, and a pulley on the outer end of the arm.

10. In a garden tool, a cutting blade provided with a stem, a handle mounted on said stem and a guiding element for said blade, said element being made out of a single strip of material doubled on itself to form two arms, and a pulley mounted between said arms, one of said arms being longer than the other and being pivotally mounted on the stem between the blade and handle.

11. In a garden tool, a cutting blade, a stem for said blade, a handle secured to said stem, a guard mounted on said blade, said guard including a substantially horizontal part having an upwardly directed forward end, and a guiding element for said blade, said guiding element being made out of a single strip of material doubled on itself to form two arms, and a pulley mounted between said arms, one of said arms being longer than the other and being pivotally mounted on the stem between the blade and handle.

In witness whereof, I have hereunto set my hand this 26th day of April, 1928.

BERNARD D. ADAMS.